(12) United States Patent
Borsutsky et al.

(10) Patent No.: US 10,841,250 B2
(45) Date of Patent: *Nov. 17, 2020

(54) MESSAGING BOT SELECTION IN MULTI-BOT CHAT SESSIONS

(71) Applicant: Microsoft Technology Licensing, LLC, Redmond, WA (US)

(72) Inventors: Yuval Pinchas Borsutsky, Rishon Le-zion (IL); Keren Damari, Tel Aviv (IL); Benny Schlesinger, Ramat Hasharon (IL); Avichai Cohen, Givat Shmuel (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/437,399

(22) Filed: Jun. 11, 2019

(65) Prior Publication Data

US 2019/0356613 A1 Nov. 21, 2019

Related U.S. Application Data

(63) Continuation of application No. 15/289,369, filed on Oct. 10, 2016, now Pat. No. 10,361,975.

(51) Int. Cl.
*H04L 12/58* (2006.01)
*H04L 29/08* (2006.01)
*G06F 16/00* (2019.01)
*G06F 40/35* (2020.01)

(52) U.S. Cl.
CPC .............. *H04L 51/02* (2013.01); *G06F 16/00* (2019.01); *G06F 40/35* (2020.01); *H04L 51/16* (2013.01); *H04L 67/306* (2013.01); *H04L 51/04* (2013.01); *H04L 67/142* (2013.01); *H04L 67/146* (2013.01)

(58) Field of Classification Search
CPC ....... H04L 51/02; H04L 51/04; H04L 51/046; H04L 51/16; H04L 67/02
See application file for complete search history.

(56) References Cited

U.S. PATENT DOCUMENTS

| | | | |
|---|---|---|---|
| 2016/0035353 A1* | 2/2016 | Chen | G10L 17/22 704/235 |
| 2016/0119477 A1* | 4/2016 | Sharpe | H04W 4/21 379/265.09 |
| 2016/0142541 A1* | 5/2016 | Sharpe | H04M 3/5141 379/92.01 |
| 2017/0048170 A1* | 2/2017 | Smullen | H04L 67/322 |
| 2017/0250935 A1* | 8/2017 | Rosenberg | H04L 51/16 |

(Continued)

*Primary Examiner* — Shean Tokuta

(57) ABSTRACT

A user profile and messaging bots can be joined to participate in a group chat session. A first natural language requirement set can be received from the profile and sent to the bots. A first solution set from a first bot can be processed, with the set including a first natural language script describing a first solution to the requirement set. A second solution set from a second bot can be processed, with the set including a second natural language script that describes a second solution to the requirement set. The first and second scripts can be sent to the profile, and at least part of each solution set can be sent to the other bot. A selection of the first bot for providing a solution to the requirement set can be received from the profile, and an indication of the selection can be transmitted to the first bot.

20 Claims, 6 Drawing Sheets

SOFTWARE 180 IMPLEMENTING MESSAGING BOT SELECTION IN MULTI-BOT CHAT SESSIONS

(56) References Cited

U.S. PATENT DOCUMENTS

2017/0295114 A1\* 10/2017 Goldberg ............... G06N 20/00
2017/0300831 A1\* 10/2017 Gelfenbeyn ........ G10L 15/1815
2019/0199658 A1\* 6/2019 Kim .................. G06F 16/90332

\* cited by examiner

MESSAGING BOT SELECTION IN MULTI-BOT CHAT SESSIONS

RELATED APPLICATIONS

The present application is a continuation of U.S. application Ser. No. 15/289,369, filed Oct. 10, 2016, now issued U.S. Pat. No. 10,361,975, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

A messaging bot (or messaging robot) is a configuration of computer hardware (e.g., dedicated hardware logic components and/or hardware configured with software) that, when it is run or executed, automatically interacts using a natural language dialog, which can include receiving natural language instructions, processing those instructions, and responding with natural language dialog scripts. A natural language is a language used in natural conversation between human beings, such as Mandarin Chinese, Spanish, English, Hindi, Arabic, Portuguese, Japanese, German, French, etc. Natural language can also include language modifications that are used in natural conversation between human beings in various different contexts, such as digital messaging conversations, in-person conversations, etc. For example, such modifications may include mixtures of formal languages, abbreviations, and/or slang. Messaging bots have typically been employed to conduct dialogs with computer-readable profiles, which are collections of computer-readable profile data in computer systems that can be active in computer environments (such as where credentials for a profile have been submitted into the computer system to log into an environment with the profile), with the bot receiving natural language instructions from one or more profiles and responding to instructions by generating and sending responsive dialog scripts.

SUMMARY

The tools and techniques discussed herein relate to communications with messaging bots and selection of messaging bots for providing a solution related to a user profile's requirements in a group chat session that involves multiple messaging bots.

In one aspect, the tools and techniques can include joining a user profile and a plurality of different messaging bots into a group chat session being conducted over a messaging computer system. A first natural language requirement data set can be received from the user profile and sent to the plurality of messaging bots. A first solution data set from a first messaging bot can be processed, with the first solution data set being responsive to the first requirement data set, and with the first solution data set including a first natural language script that describes a first proposed solution that is responsive to the first requirement data set. A second solution data set from a second messaging bot can be processed, with the second solution data set being responsive to the first requirement data set, and with the second solution data set including a second natural language script that describes a second proposed solution that is responsive to the first requirement data set. The first natural language script and the second natural language script can be sent to the user profile in response to the first requirement data set. At least a portion of the first solution data set can be sent to the second messaging bot, and at least a portion of the second solution data set can be sent to the first messaging bot. A computer-readable selection of the first messaging bot for providing a selected solution related to the first requirement data set can be received from the user profile, and a computer-readable indication of the computer-readable selection can be transmitted to the first messaging bot.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
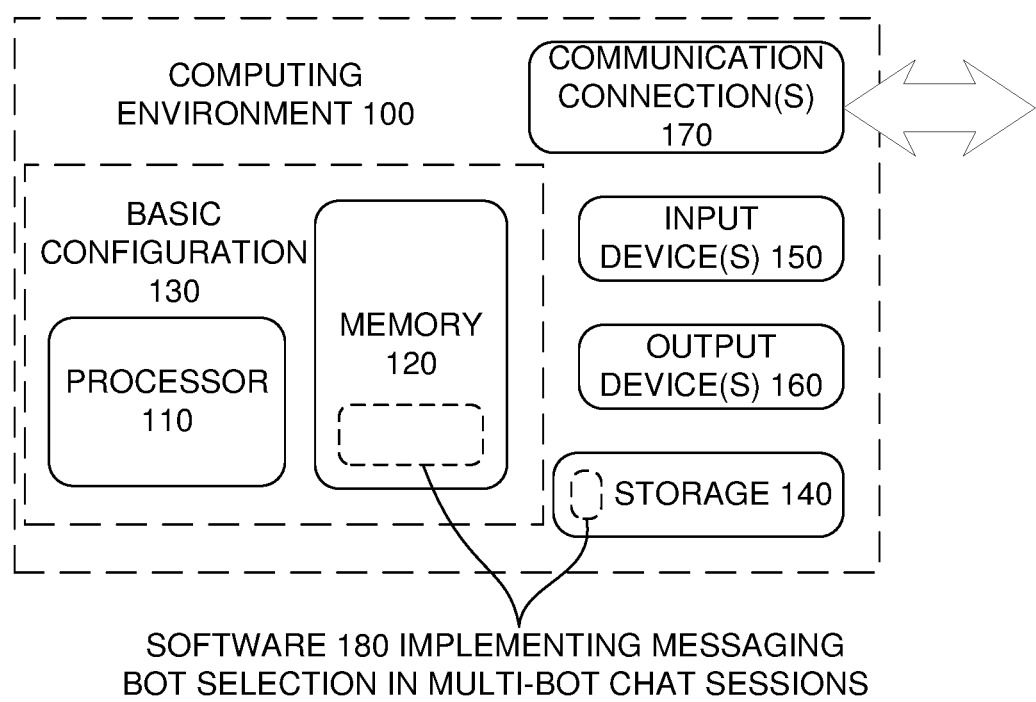
FIG. 1 is a block diagram of a suitable computing environment in which one or more of the described aspects may be implemented.

Aspects described herein are directed to techniques and tools for selection of a messaging bot from a group chat session involving multiple messaging bots, to provide a solution in response to a user profile's requirements. Such improvements may result from the use of various techniques and tools separately or in combination.

Such techniques and tools may include a messaging computer system that facilitates a user profile chatting concurrently with multiple messaging bots that can each arrange for a solution to meet the user profile's requirements. As used herein, a user profile is a set of data that represents an entity such as a user, a group of users, a computing resource, etc. When references are made herein to a user profile performing actions (sending, receiving, etc.), those actions are considered to be performed by a user profile if they are performed by computer components in an environment where the user profile is active (such as where the user profile is logged into an environment and that environment controls the performance of the actions). The user profile may express its desires just once and then different messaging bots can offer their solutions (such as data, services and/or goods). Each of the bots can see the communication of the other bots and can react accordingly, for example to outbid offers of solutions by the other messaging bots. The user profile can select one of the bots to provide a solution, and the user profile and that selected bot can arrange for the providing of the solution. The system may provide one or more of multiple different features. For example, the interactions between the bots and the user profile can occur in a group chat session, where the messaging bots may be configured to react to each other. The interactions between the bots can also be communicated to the user profile, to provide transparency in the group chat session. Similarly, the system can provide the bots with data representing the solutions offered by other bots in the group chat session. In some implementations, the data representing the solutions may be provided to other bots in natural language form, using the same language that is sent to the user profile. In other implementations, the data regarding the bots' solutions may be transmitted in a computer-readable form between the bots, while the solutions may be communicated in a different natural language form to the user profile. This can allow the bots to process other bots' solutions without conducting full natural language understanding techniques on the data from the other bots. Also, the computer-readable data may be verified by the system, to assure that the solution data provided to the other bots matches the solution data provided to the user profile.

In prior techniques where messaging bots have provided solutions to user profiles, the user profile would communicate with a single bot separately to find out about solutions the messaging bot can provides and to arrange for the services to be provided. If a user profile were to do this for multiple messaging bots in order to select one, it would be much less efficient in terms of time and computations resources, as compared to the group chat sessions discussed herein with multiple messaging bots providing their proposed solutions in a single group chat session. Additional efficiencies and usability enhancements can be provided with particular features discussed herein, such as providing the messaging bots with the ability to react to each other's proposed solutions within the group chat, providing later-added messaging bots with stored records of previous communications from the group chat session, and/or communicating proposed solutions between bots in a computer-readable format that is different from the natural language scripts of the solutions provided to the user profile as part of the group chat session.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client device, and/or a device in a service, such as a bot service and/or a messaging service. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing messaging bot selection in multi-bot chat sessions. An implementation of messaging bot selection in multi-bot chat sessions may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Natural Language Messaging Bot Computer System

Figure 2:
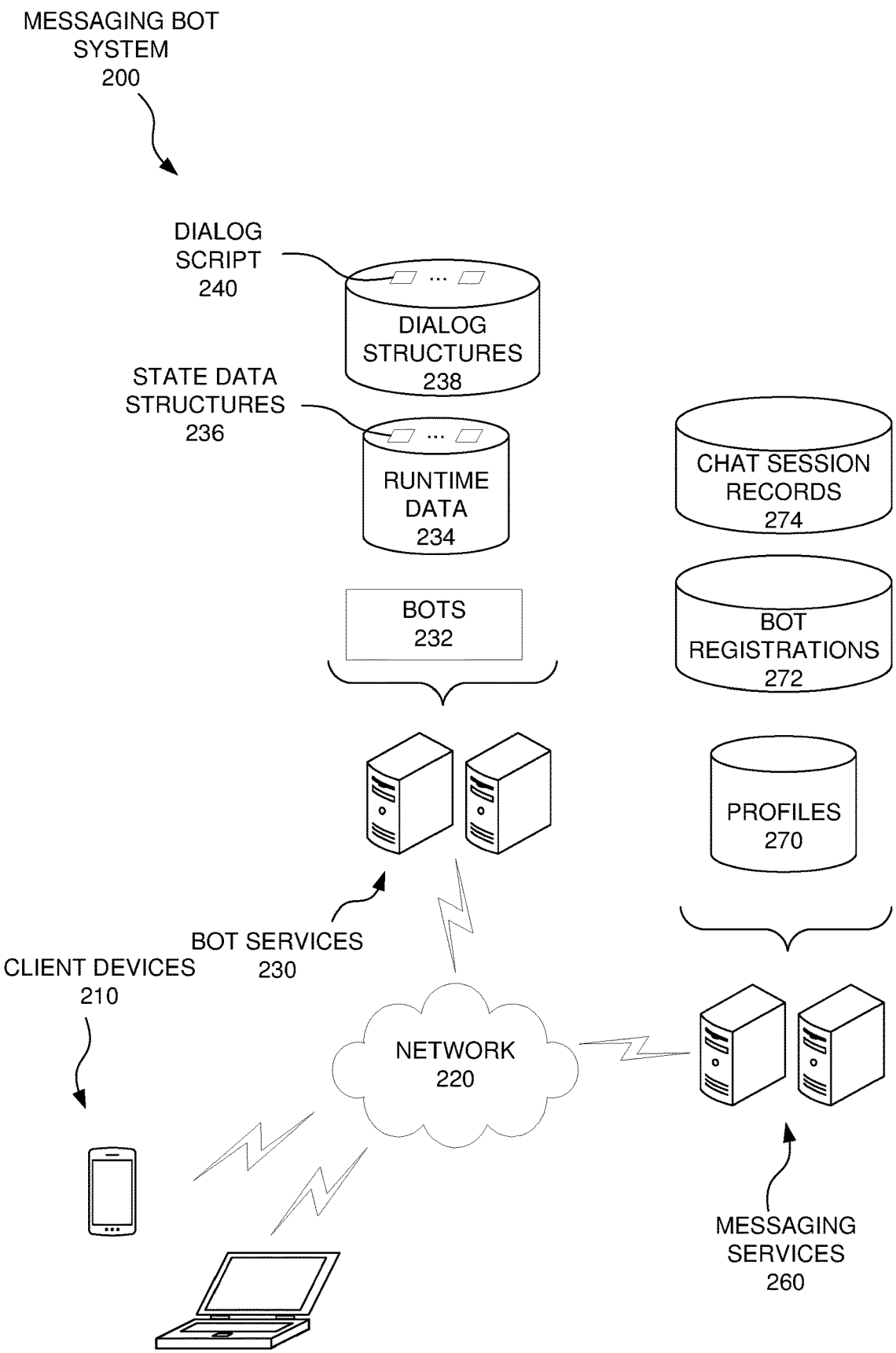
FIG. 2 is a schematic diagram of a natural language messaging bot computer system.

FIG. 2 is a schematic diagram of a natural language messaging bot computer system (200) in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. Components of the Natural Language Messaging Bot System

Referring now to FIG. 2, components of the messaging system (200) will be discussed. Each of the components includes hardware, and may also include software. For example, a component of FIG. 3 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

The components of the messaging system (200) can include client devices (210), which can include any of various different types of client computing devices, such as smart phones, tablets, laptops, desktop computers, wearable devices, etc. The client devices (210) can communicate over a computer network (220) with computerized services. The network (220) may include multiple different interconnected wired and/or wireless sub-networks.

The services connected to the network (220) can include bot services (230), which can run computerized messaging bots (232). The messaging bots (232) can be programmed to automatically interact using a natural language dialog, which can include receiving natural language instructions, processing those instructions, and responding with natural language dialog scripts. In conducting such dialogs, the messaging bots (232) can maintain and utilize runtime data (234), which can include state data structures (236), which are data structures that maintain the state of dialogs in which the bots (232) are participating. The bot services (230) can also include dialog structures (238), which can include dialog scripts (240) to be used by the bots (232) in responding to received instructions. Such dialog scripts (240) may be stored in any of various forms, such as set natural language statements, natural language dialog rules, and/or natural language templates with placeholders to be filled in with content that is specific to a particular dialog.

Each messaging bot (232) can be programmed to include or invoke a natural language understanding computer component. The language understanding component may include one or more known components for natural language understanding. For example, the language understanding component may utilize a lexicon of the natural language, as well as a parser and grammar rules to break each natural language phrase into a data representation of the phrase. The language understanding component may also utilize a semantic theory to guide comprehension, such as a theory based on naïve semantics, stochastic semantic analysis, and/or pragmatics to derive meaning from context. Also, the language understanding component may incorporate logical inference techniques by mapping a derived meaning into a set of assertions in predicate logic, and then using logical deduction to arrive at conclusions as to the meaning of the text. Using results of such language understanding techniques, the language understanding component can map the resulting derived meanings to one or more commands to be passed to one or more other components, such as a messaging bot (232).

Each messaging bot (232) can also be programmed to include or invoke a dialog management component. The dialog management component can manage the dialog structures (238), such as by making updates to the dialog scripts (240). Each dialog script (240) may be particular to a single messaging bot (232), or may be shared among multiple messaging bots (232). The dialog management component can also receive commands from the language understanding component, and can provide dialog scripts that are appropriate responses to the received commands derived from natural language instructions, such as those sent from another messaging bot (232) or from a user profile. Those dialog scripts can be sent to one or more messaging services (260) for distribution to profiles (270) and/or bots (232) participating in a group chat session.

Each messaging service (260) can maintain computer-readable profiles (270). A messaging service (260) can also maintain bot registrations (272). Each bot registration (272) can be computer data that identifies or describes one or more endpoints or network locations where communications to a particular bot (232) can be sent. A bot registration (272) may also include other information, such as types of services to be provided by the bot, protocol information for communicating with the bot (232), etc. Each bot (232) can respond to communications from a messaging service (260) using information (such as return address information) sent from the messaging service.

Each messaging service may also maintain chat session records (274), with each chat session record being a record of a particular chat session. As used herein, a chat session is a communication session that includes natural language communications over a computer system, where the communications of the chat session are all identified with that particular session and part of an ongoing conversation over a computer system. For example, all the communications may be identified with one or more chat session identifiers that is identified with that chat session in the messaging bot system.

Figure 3:
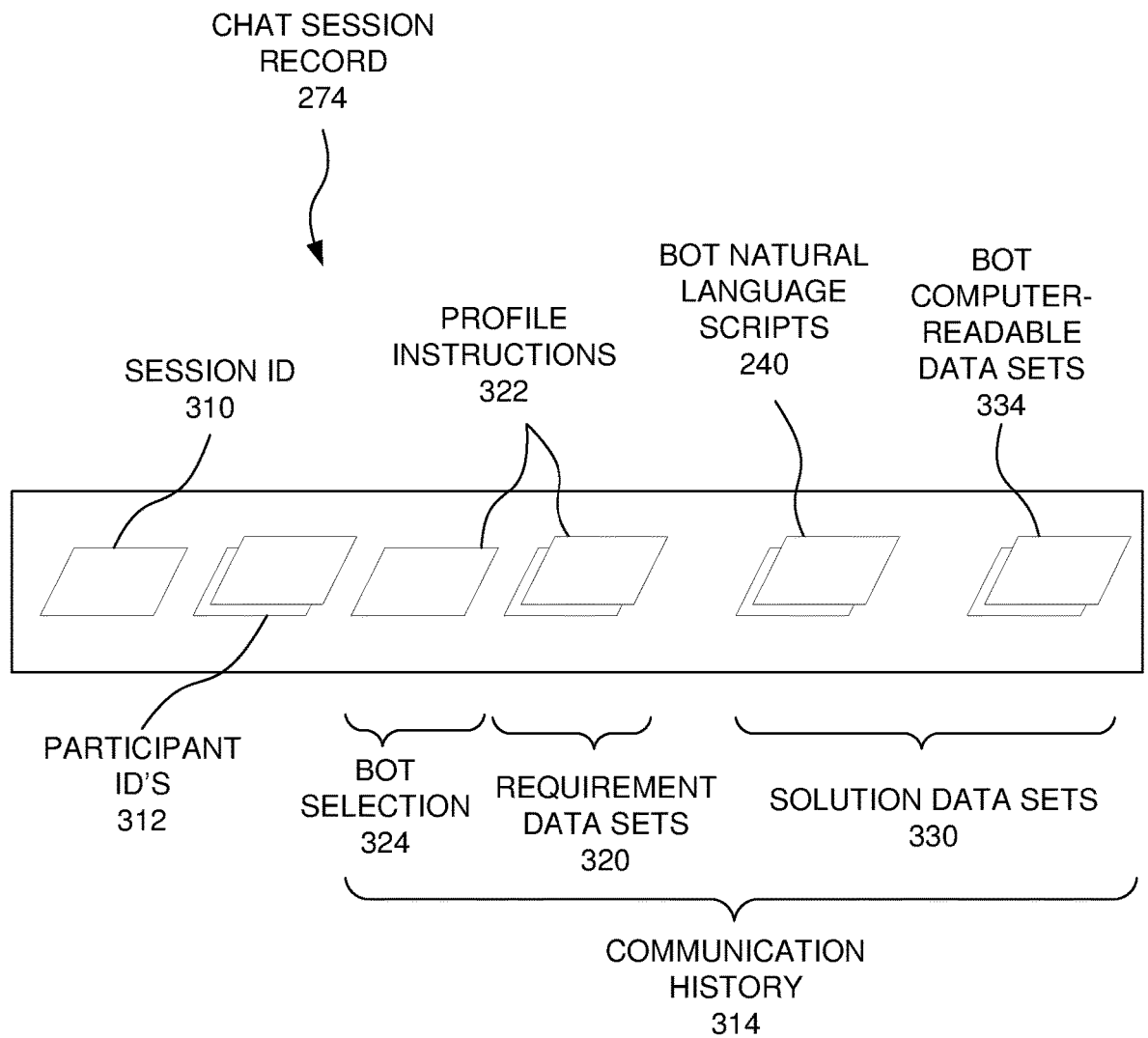
FIG. 3 is a schematic diagram of a chat session record.

Referring now to FIG. 3 and still referring to FIG. 2, an example of a chat session record (274) will be discussed. A chat session record (274) can include a session identifier (310), which can be a set of data used to identify the chat session. A series of session identifiers (310) may be used for a single session. For example, a different session identifier (310) may be provided to each of the participants in a chat session. In this case, the chat session record (274) may include a list of such identifiers (310), along with a participant identifier (312) to which each session identifier (310) corresponds. The chat session record (274) can also include a participant identifier (312) for each participant (such as each messaging bot (232) and each profile (270)) in the chat session.

The chat session record (274) can also include a communication history (314) of the communications between participants in the chat session. For example, the communication history (314) can include requirement data sets (320), which can set forth requirements from a profile (270) that are to be met by proposed solutions from the messaging bots (232). Such requirement data sets (320) may include profile instructions (322), which are instructions (such as natural language instructions) provided by a profile (270) during the chat session. The profile instructions (322) may include additional instructions other than the requirement data sets (320). Also, the requirement data sets (320) may include some non-natural language instructions, such as where a user selects a displayed user interface control to provide a portion of a requirement data set (320). Also, a requirement data set may include multiple profile instructions (322), such as where the profile's requirements are set forth in a series of profile instructions (322) that are part of the chat session.

A requirement data set (320) may also include other data that is derived from the profile instructions (322), such as data from natural language understanding operations performed on the natural language profile instructions (322). Indeed, such derived data can still be considered to be the profile instructions (322) themselves, and communications of such derived data can be considered to be communications of the natural language profile instructions (322). For example, natural language profile instructions (322) can be communicated to the messaging bots (232) in a session by communicating the instructions (322) in their natural language form, or in some other form, such as by communicating computer-readable intents of the instructions, as determined by a natural language understanding component. Accordingly, the profile instructions (322) may be stored in the chat session record (274) in their original natural language form, or in some other form derived from the natural language and retaining derived meanings of the natural language instructions.

The communication history (314) in the chat session record (274) can also include solution data sets (330). Such solution data sets (330) can set forth descriptions of solutions that the bots provide to meet the requirements in the requirement data sets (320). However, each solution data set (330) may not meet all the requirements. (For example, if the requirement is for a particular type of pizza to be delivered in fifteen minutes, a messaging bot (232) may counter with a solution data set (330) for the pizza, but stating that it will take twenty minutes to deliver the pizza.) Each solution data set (330) may include one or more bot natural language scripts (240) describing a proposed solution to a profile's requirements and/or bot computer-readable data sets (334) describing that proposed solution. The computer-readable data set (334) may be processed by receiving a messaging bot (232) without conducting full natural language understanding operation on the computer-readable data set (334) to understand the proposed solution described therein.

The data discussed herein, such as the runtime data (234), the dialog structures (238), the profiles (270), the bot registrations (272), and the chat session records (274) may be in various different formats, such as files (e.g., extensible markup language files), database tables, and/or other data structures that are able to be accessed, read, and revised by the messaging bot system (200). Likewise, the data (such as requirement data sets (320) and solution data sets (330)) may be communicated between different computer components of the messaging bot system (200) in the same format in which the data is stored and/or in some other format. Also, the data in a particular data structure may be distributed among multiple different memory locations, or stored in adjacent memory locations.

A single session may be conducted over multiple messaging services (260). In this case, a master chat session record (274) may be maintained by one of the messaging services (260) and/or by some other computer service (such as by a bot service (230)), or the chat session record (274) may be distributed across different computer components. Messages can be passed between the different messaging services (260) and the bot services (230) using application programming interfaces. For example, in a session with multiple messaging services (260), a requirement data set (320) may be sent from a client device (210) where a profile is active (such as by being logged in) to a first messaging service (260). That first messaging service (260) may send the requirement data set (320) to a first set of one or more bots (232) and to a second messaging service (260). That second messaging service (260) may send the requirement data set to a second set of one or more bots (232) connected to that second messaging service (260). Solution data sets (330) may similarly be distributed using multiple messaging services (260). This sending between different messaging services (260) may be coordinated by a central framework, such as a messaging bot framework, which may act as an intermediary between the different messaging services.

Also, the bots (232) for a group chat session may all be hosted by one bot service (230), or by multiple different bot services (230), which may be distributed across different geographical and/or computer network boundaries. Other alternative configurations of the messaging bot system (200) may also be used.

B. Operation of the Natural Language Messaging Bot System

Operation of the messaging bot system (200) will now be discussed. In operation, a chat session may begin with a messaging service (260) joining a profile (270) (which can be active on a client device (210)) and multiple bots (232) into a chat session. For example, this can include adding participant identifiers (312) for the profile (270) and the messaging bots (232) to a chat session record (274), so that the messaging bot system (200) can distribute messages from each participant (messaging bot (232) or profile (270)) to other participants in the chat session.

Natural language profile instruction(s) (322) can be entered by user input at a client device (210) for a profile (270) that is active on the client device (210). For example, such input may be in the form of typed input on a mechanical or displayed keyboard, voice input, non-touch gestural input, etc. The client device (210) where the profile (270) is active can send the natural language input to a messaging service (260), which can be considered to be the profile (270) sending the natural language profile instruction(s) (322) from the profile (270). The user profile (270) can also send the session identifier with the natural language instruction(s) (322). For example, the client device (210) may have received the session identifier (310) from the messaging service (260) during an initiation operating at the beginning of the session.

The messaging service (260) can access the chat session record (274) corresponding to the received session identifier (310), and can use the chat session record (274) to identify participants in the session (such as by reading the participant identifiers (312) in the session record (274)). The messaging service (260) can then send the received natural language instruction(s) (322) to the messaging bots (232) whose identifiers are listed in the session record (274). The messaging service (260) can store the natural language instruction(s) (322) in the chat session record (274).

The natural language instruction(s) (322) can include a requirement data set (320). Upon receiving the requirement data set (320), each messaging bot (232) can perform language understanding using a language understanding component to understand the requirements in the requirement data set (320). The messaging bot (232) can also correlate such requirements with a natural language dialog script (240), which can describe a proposed solution from the bot (232). Each bot (232) may thus generate a natural language dialog script (240), which can be part of a solution data set (330). Such a messaging bot (232) may also generate a corresponding computer-readable data set (334), which can also describe the proposed solution. The computer-readable data set (334) may be in a computer-readable format that a receiving messaging bot (232) can read and process without conducting a full natural language understanding process. For example, the computer-readable format may be a markup language format or some other computer-readable format that is different from the natural language dialog script (240). The computer-readable data set (334) can be generated using data and instructions accessible to the bot (232), such as computer code and/or data such as templates and code for filling in the templates to form the computer-readable data set (334).

The bot (232) can also send the solution data set (330), which may include a dialog script (240) and possibly the corresponding computer-readable dataset (334), to the messaging service (260) for distribution to the group of participants for the chat session. The messaging service (260) can receive the dialog script (240) and possibly the corresponding computer-readable dataset (334) of the solution data set (330), store the dialog script (240) and/or the computer-readable dataset (334) in the chat session record (274), and distribute at least a portion of the solution data set (330) to the other chat session participants. For example, this distribution may include sending the bot computer-readable data set (334) to the other messaging bots (232) in the session, and sending the natural language dialog script (240) to the user profile (270) at the client device (210).

Upon receiving such a solution data set (330), another messaging bot (232) can process the solution data set (330). If the solution data set (330) includes only a natural language script (240), the receiving messaging bot (232) may perform natural language understanding processes on the script to understand and react to the solution data set (330). However, if the solution data set (330) includes a computer-readable data set (334), the receiving messaging bot (232) can process the computer-readable data set (334) without performing a full natural language understanding analysis. For example, if the computer-readable data set (334) is in a markup language that is understood by the receiving messaging bot (232), the receiving messaging bot (232) can parse the markup language code of the computer-readable data set to understand the received solution data set (330).

The receiving messaging bot (232) may respond to a received solution data set (330) from another messaging bot (232) by generating a new solution data set (330) of its own, or which may include modifying its previously sent solution data set (330), which can include a bot natural language script (240) and possibly a computer-readable data set (334) describing the proposed solution. The receiving messaging bot (232) may respond in other ways, such as by generating a natural language dialog script (240) in the form of a statement that provides the user profile (270) with additional information (such as by providing information on advantages of its own proposed solution and/or disadvantages of another messaging bot's proposed solution). The messaging bots (232) may continue responding to each other in this manner, in a series of communications as part of the chat session.

The profile (270) may also modify its requirements data set (320) during the chat session. For example, the profile (270) may add an additional requirement to the requirements data set (320), make an existing requirement more stringent, remove a requirement from the requirement data set (320), and/or make an existing requirement less stringent. The profile (270) may send profile instructions (322) to modify some portion of an existing requirement data set (320) or to include an entirely new requirement data set (320) as part of the chat session.

An additional messaging bot (232) may be added to an ongoing chat session where a requirement data set (320) and/or one or more solution data sets (330) have already been published in the chat session. In such a scenario, the messaging service (260) can provide the communication history (314) to the new messaging bot (232). For example, the messaging service (260) may do so as part of a process of joining the new messaging bot (232) to the chat session. This can increase efficiency, by facilitating the new messaging bot (232) gaining an understanding of the existing chat session without the profile (270) in the chat session having to inform the new messaging bot (232) of the already-published requirement data sets (320) or solution data sets (330). Accordingly, such a new messaging bot (232) may proceed to generate and publish its own solution data set (330) without waiting for additional messages from the user profile (270) or the other messaging bots (232).

The profile (270) can generate and publish a bot selection (324) in the chat session. For example, the bot selection may be a natural language selection (324). Alternatively, the bot selection may use some form of non-natural language user input, such as a selection of a displayed control corresponding to a selected messaging bot (232). In either event, the messaging service (260) can receive the selection (324), can store the selection in the chat session record (274), and can send an indication of the selection to the messaging bots (232) in the session, informing the bots (232) of the selection.

Following such a selection (324), non-selected messaging bots (232) may be dropped from the chat session. For example, this may be done automatically by the messaging service (260) in response to receipt of the selection (324). Alternatively, the profile (270) may provide an instruction (322) to remove the other bots from the chat session. In either event, the messaging service (260) can remove the participant identifiers (312) for the non-selected messaging bots (232) from the chat session record. The chat session can then proceed with the user profile (270) and the selected messaging bot (232) to arrange for the selected messaging bot's selected solution to be provided. For example, this may include the profile (270) providing the selected messaging bot (232) with addition information, such as address information. It may also involve payment processing, which may include the selected messaging bot (232) performing payment processing if the chat session is sufficiently secure. If not, then the selected messaging bot (232) can direct the user profile (270) to a secure payment processing computer component.

C. Messaging Bot Selection Examples in Multi-Bot Chat Sessions

Specific examples of some example dialogs for messaging bot selection in multi-bot chat sessions will now be discussed.

As a first example, consider a user profile (270) that is to order a pizza, to be delivered to a residential address. The user profile (270) can begin the chat session by joining multiple pizza delivery messaging bots (232) into the chat session. For example, the user profile (270) may instruct the messaging bot system (200) to do this by making a selection on a display or expressly requesting the bots (232) to be joined. Alternatively, the user profile (270) may provide natural language input with its initial requirements. Following is an example of how the dialog may go for a bot for Pizza Store A and a bot for Pizza Store B, with all these natural language statements being sent as part of a group chat session, as discussed above:

Profile: "Join bots for Pizza Store A and Pizza Store B."
System: "The requested bots are joined in your session."
Profile: "I want a large pepperoni pizza delivered to 1234 A Street, New York City, N.Y. State, United States, within 30 minutes."
Pizza Store A Bot: "I can have a large pepperoni pizza delivered to that address within twenty minutes of you completing the order, and it will cost you $14.00."
Pizza Store B Bot: "I can have a large pepperoni pizza delivered to that address within twenty-three minutes of you completing the order, and it will cost $12.00."

Pizza Store A Bot: "For this order only, I can have your pizza delivered for $11, rather than $14."

Pizza Store B Bot: "Be aware that Pizza Store A only provides thin crust pizzas. We can provide you a thick crust pizza for $12.00."

Profile: "I want to change my order to a large sausage and pepper pizza. What prices can you provide."

Pizza Store B Bot: "I can get you the large sausage and pepper pizza for $12.00."

Pizza Store A Bot: "I can get you the large sausage and pepper pizza for $11.00."

Profile: "I choose Pizza Store B, with the thick crust."

System "Pizza Store A Bot has been dropped from the session. You are now chatting only with Pizza Store B Bot."

Pizza Store B Bot: "Would you like to pay now with a credit card or pay cash when your pizza is delivered?"

Profile: "When the pizza is delivered."

Pizza Store B Bot: "Thank you for your order. Your large sausage and pepper pizza will arrive at 1234 A Street, New York City, N.Y. State, United States, within twenty-three minutes."

In a group chat session, multiple messaging bots (232) may combine to each present part of a solution to the profile's requirements, so that a complete solution is provided by the combination of these multiple bots. Such a session may be conducted in the same manner as the sessions described above where each bot presented a complete solution. Consider the following session dialog for a profile requesting an installed air conditioner at a particular address:

Profile: "I need a 2-Ton air conditioner to be installed at 1234 A Street, New York City, N.Y. State, United States within one week."

Air Selling Bot: "I can have a Commercial/Residential 2-Ton 13-SEER Central Air Conditioner delivered to 1234 A Street, New York City, N.Y. State, United States within four days for $1900. However, I cannot arrange for installation."

Air Install Bot: "I can arrange for installation of the Commercial/Residential 2-Ton 13-SEER Central Air Conditioner from Air Selling Bot within one week for $300."

Air Sell/Install Bot: "I can have a Commercial/Residential 2-Ton 13-SEER Central Air Conditioner delivered and installed at 1234 A Street, New York City, N.Y. State, United States within four days for $2400. You will only have to deal with our one business for easy delivery and installation of the air conditioner. We also provide a ten-year warranty on the installation and the air conditioner."

Profile: "I choose Air Selling Bot and Air Install Bot."

System: "Air Sell/Install Bot has been removed from the chat session."

Air Selling Bot: "I can arrange for delivery of the air conditioner by this coming Monday."

Air Install Bot: "I can arrange for the installation of the air conditioner on Wednesday morning between 8:00 and 12:00. Does that work for you?"

Profile: "Yes."

Air Selling Bot: "Please visit our secure website at https://www.airselling.com to provide payment for the air conditioner, using order number 310331. If you do this within the next two hours, the air conditioner will be delivered by Monday. Thank you for your business."

Air Install Bot: "Our installers will accept payment at the time of the installation. Thank you for your business."

It should be appreciated that these are just examples, and many other examples of messaging bot selection in multi-bot chat sessions may be provided.

III. Techniques for Messaging Bot Selection in Multi-Bot Chat Sessions

Several techniques for messaging bot selection in multi-bot chat sessions will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 4:
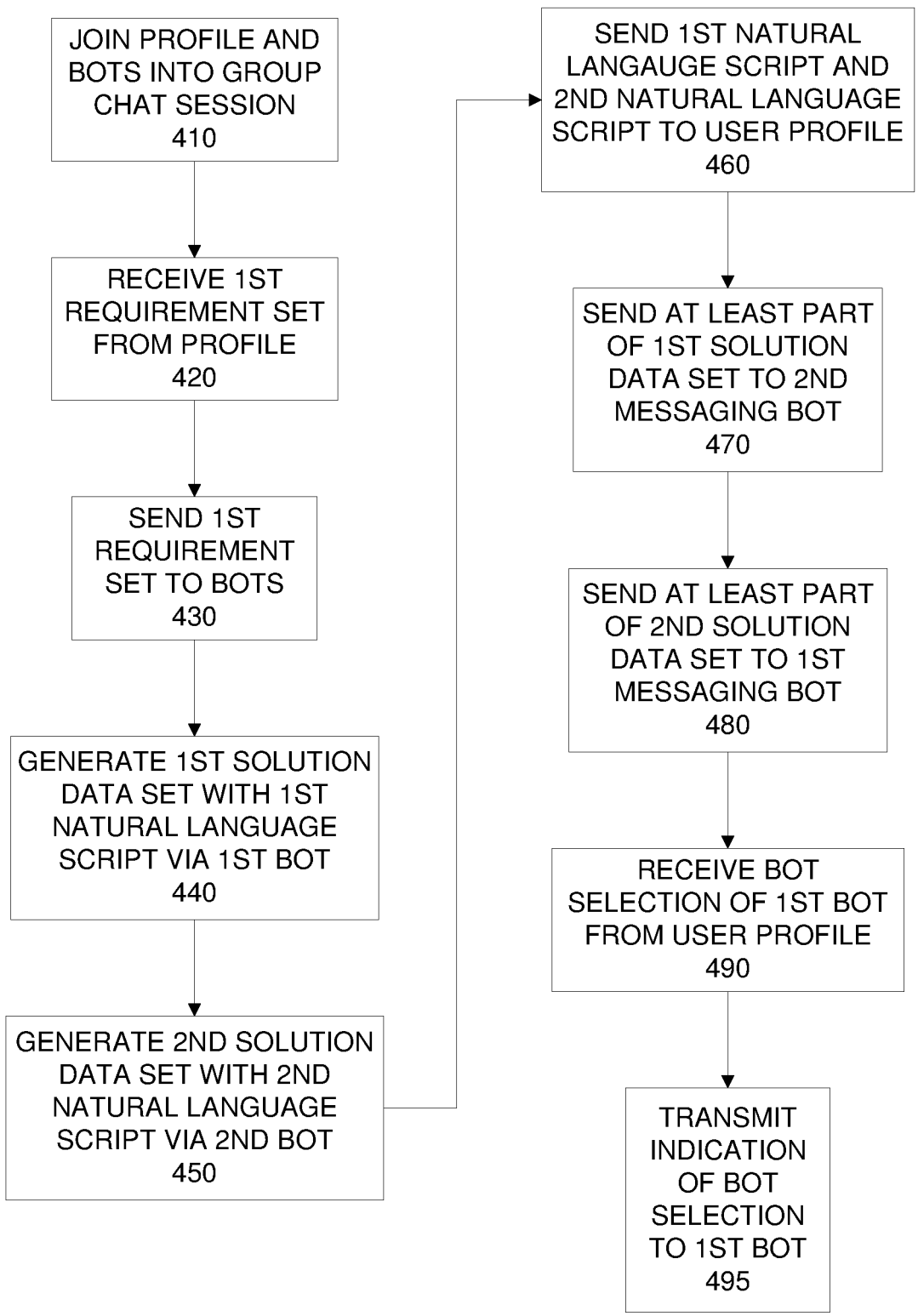
FIG. 4 is a flowchart of a technique for messaging bot selection in multi-bot chat sessions.

Referring to FIG. 4, a technique for messaging bot selection in multi-bot chat sessions will be described. The technique can include joining (410) a user profile and a plurality of different messaging bots into a group chat session being conducted over a messaging computer system. A first natural language requirement data set can be received (420), and the first requirement data set can be sent (430) to the plurality of messaging bots, both via the messaging computer system as part of the session. Communications can be made over different channels, using different protocols, etc. and still be part of the same group chat session, so long as the data communicated as part of the session is communicated to the other group members with all the communications being identified as part of the session within the computer system, though the communications may involve reformatting the data of the communications and possibly sending some communications in different formats to different session participants (such as where communications are made to other bots in different formats than to a profile, or where communications are made using multiple different messaging systems that use different communication protocols). A first solution data set can be generated (440), via a first messaging bot of the plurality of bots, in response to receiving the first requirement data set. The first solution data set can include a first natural language script that describes a first proposed solution that is responsive to the first requirement data set. A second solution data set can be generated (450), via a second messaging bot of the plurality of bots, in response to receiving the first requirement data set and the first solution data set. The second solution data set can include a second natural language script that describes a second proposed solution that is responsive to the first requirement data set and responsive to the first solution data set. The technique can further include sending (460) the first natural language script and the second natural language script to the user profile in response to the first requirement data set; sending (470) at least a portion of the first solution data set to the second messaging bot; and sending (480) at least a portion of the second solution data set to the first messaging bot, via the messaging computer system as part of the session. These acts may be in response to the first solution data set and the second solution data set (some parts of these acts (460, 470, and 480) may be in response to only the first solution data set, some in response to only the second solution data set, and some in response to the first solution data set and the second solution data set). A selection of the first messaging bot for providing a selected solution related to the first requirement data set can be received (490) from the user profile as part of the session. Additionally, an indication of the selection can be transmitted (495) to the first messaging bot as part of the session. This technique can include the features of the following paragraphs that are described with reference to this technique of FIG. 4, in any combination with each other.

The technique can further include generating, via a third messaging bot of the plurality of bots, a third solution data set in response to receiving the first requirement data set. The third solution data set can include a third natural language script that describes a third proposed solution that is responsive to the first requirement data set, with the third proposed solution supplementing the first proposed solution, with the third proposed solution and the first proposed solution each fulfilling part of the first requirement data set. The technique can also include sending the third natural language script to the user profile in response to the first requirement data set; sending at least a portion of the third solution data set to the first messaging bot and the second messaging bot; sending at least a portion of each of the first solution data set and the second solution data set to the third messaging bot; and transmitting to the third messaging bot an indication of the selection as part of the session. The selection can be a selection of the first messaging bot and the third messaging bot to provide a combined solution related to the first requirement data set.

The technique of FIG. 4 can further include generating, via the second messaging bot, an initial solution data set in response to receiving the first natural language requirement data set. The initial solution data set can include an initial natural language script that describes an initial proposed solution that is responsive to the first requirement data set and is not responsive to the first solution data set. The generating of the initial solution data set can be prior to the generating (440) of the first solution data set. The second solution data set can be a modification of the initial solution data set.

The technique of FIG. 4 can include receiving, via the messaging computer system, a second natural language requirement data set from the user profile at a computing device. The second requirement data set can be a modification of the first requirement data set. The second requirement data set can be sent to the plurality of messaging bots via the messaging computer system. The technique can further include generating, via the first messaging bot, a third solution data set in response to receiving the second requirement data set. The third solution data set can include a third natural language script that describes a third proposed solution that is responsive to the second requirement data set. The selection of the first messaging bot for providing a selected solution related to the first requirement data set can include selecting the first messaging bot for providing a solution to the second requirement data set.

The technique of FIG. 4 can include the messaging computer system tracking the session using one or more computer-readable session identifiers.

In the FIG. 4 technique, the first solution data set can further include a first set of computer-readable data that describes the first proposed solution. The first set of computer-readable data can be different from the first natural language script. The second solution data set can further include a second set of computer-readable data that describes the second proposed solution, with the second set of computer-readable data being different from the second natural language script. The sending of at least a portion of the first solution data set to the second messaging bot can include sending the first set of computer-readable data to the second messaging bot. Also, the sending of at least a portion of the second solution data set to the first messaging bot can include sending the second set of computer-readable data to the first messaging bot.

The selection of the FIG. 4 technique can be a natural language selection.

Additionally, the technique of FIG. 4 can further include arranging for providing the selected solution via the first messaging bot using natural language scripts as part of the session after the receiving of the selection of the first messaging bot. The technique of FIG. 4 can include removing the second messaging bot from the session in response to the receiving of the selection, and before at least a portion of the arranging for providing the selected solution.

The FIG. 4 technique can further include generating, via the first messaging bot, a natural language statement regarding the second proposed solution, and sending the natural language statement to the user profile as part of the session.

Another technique for messaging bot selection in multi-bot chat sessions will be discussed with reference to FIG. 5. The FIG. 5 technique can include joining (510) a user profile and a plurality of different messaging bots into a group chat session being conducted over a messaging computer system. A first natural language requirement data set can be received (520) from the user profile via the messaging computer system as part of the session. The first requirement data set can be sent (530) to the plurality of messaging bots via the messaging computer system as part of the session. A first solution data set received from a first messaging bot of the plurality of bots can be processed (540). The first solution data set can be responsive to the first requirement data set, with the first solution data set including a first natural language script that describes a first proposed solution that is responsive to the first requirement data set. The first solution data set can further include a first set of computer-readable data that describes the first proposed solution, and with the first set of computer-readable data being different from the first natural language script. A second solution data set received from a second messaging bot of the plurality of bots can be processed (550), with the second solution data set being responsive to the first requirement data set. The second solution data set can include a second natural language script that describes a second proposed solution that is responsive to the first requirement data set, with the second solution data set further including a second set of computer-readable data that describes the second proposed solution. The second set of computer-readable data can be different from the second natural language script. The technique of FIG. 5 can also include performing the following as part of the session via the messaging computer system: sending (560) the first natural language script and the second natural language script to the user profile in response to the first requirement data set; sending (570) the first set of computer-readable data to the second messaging bot; and sending (580) the second set of computer-readable data to the first messaging bot. The technique can also include receiving (590) from the user profile a selection of the first messaging bot for providing a selected solution to the first requirement data set as part of the session, and transmitting (595) to the first messaging bot an indication of the selection as part of the session. This technique can include the features of the following paragraphs that are described with reference to this technique of FIG. 5, in any combination with each other.

Figure 5:
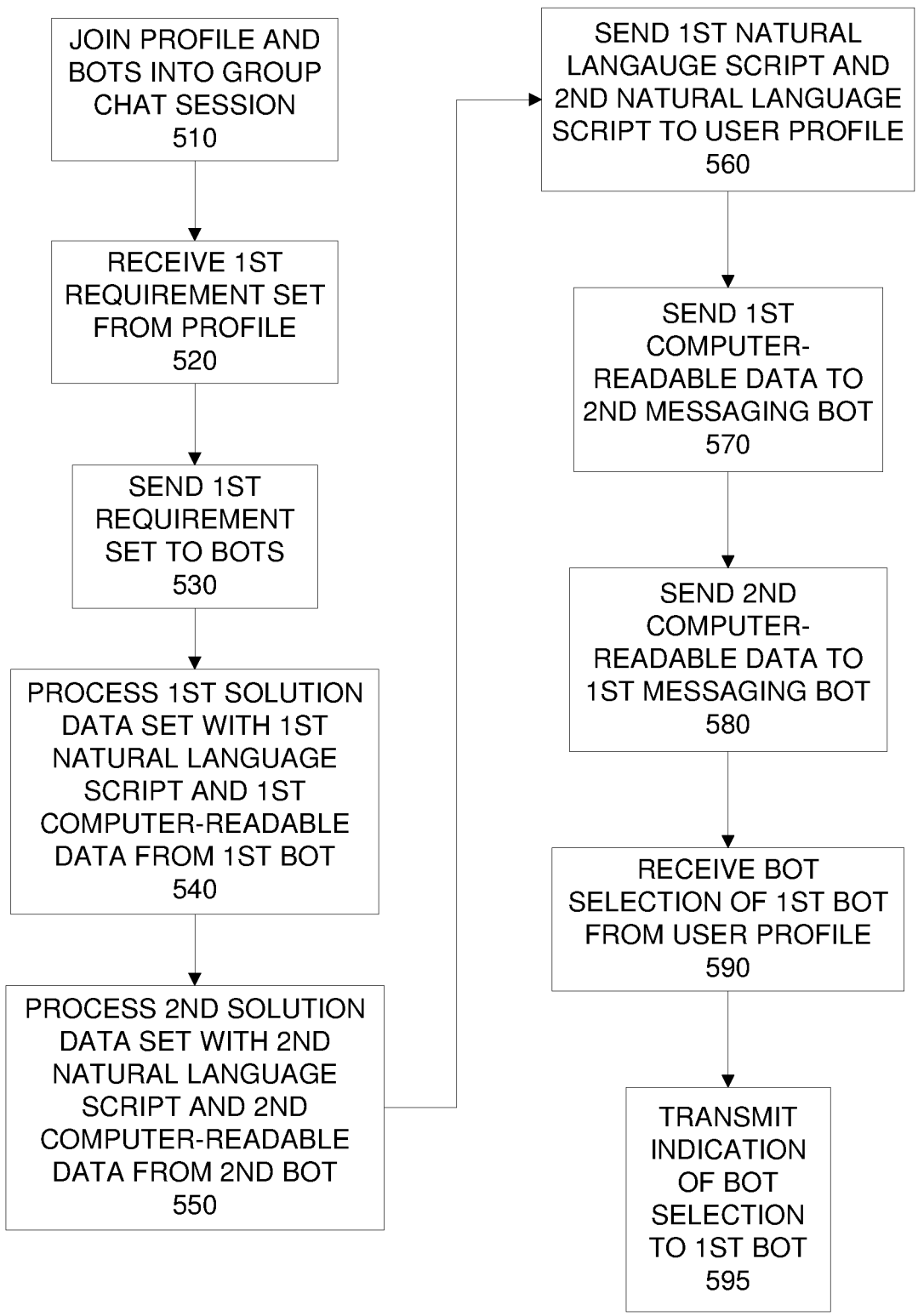
FIG. 5 is a flowchart of another technique for messaging bot selection in multi-bot chat sessions.

The technique of FIG. 5 can further include verifying via the messaging computer system that the first natural language script matches the first set of computer-readable data. For example, this can include performing natural language understanding on the first natural language script, and comparing the results to the meaning of the computer-readable data.

The second solution data set of the FIG. 5 technique can be termed an initial second solution data set. The technique of FIG. 5 can further include the second messaging bot modifying the initial second solution data set to produce a modified second solution data set in response to processing the first set of computer-readable data from the first messaging bot. The technique can also include transmitting at least a portion of the modified second solution data set to the user profile, and transmitting at least a portion of the modified second solution data set to the first messaging bot.

The technique of FIG. 5 can further include receiving, via the messaging computer system, a second natural language requirement data set from the user profile at a computing device, with the second requirement data set being a modification of the first requirement data set. The technique can also include sending, via the messaging computer system, the second requirement data set to the plurality of messaging bots. The technique can further include processing a third solution data set received from the first messaging bot. The third solution set can be responsive to the second requirement set, with the third solution data set including a third natural language script that describes a third proposed solution that is responsive to the second requirement data set. The selection of the first messaging bot for providing a selected solution related to the first requirement data set can include selecting the first messaging bot for providing a solution to the second requirement data set.

The technique of FIG. 5 may further include arranging for providing the selected solution via the first messaging bot using natural language scripts as part of the session after the receiving of the selection of the first messaging bot. The technique of FIG. 5 may also include removing the second messaging bot from the session in response to the receiving of the selection, and before at least a portion of the arranging for providing the selected solution.

Figure 6:
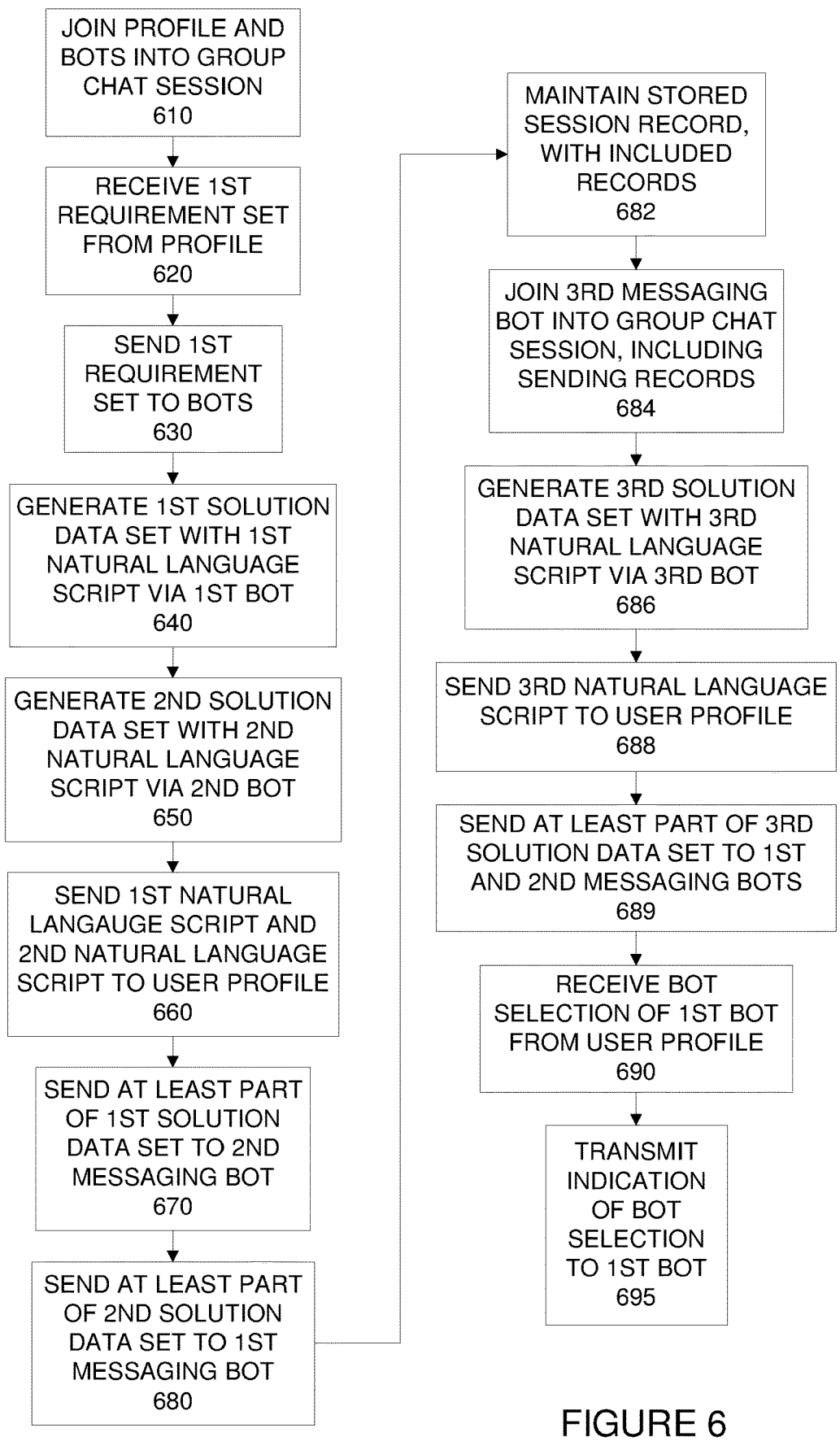
FIG. 6 is a flowchart of yet another technique for messaging bot selection in multi-bot chat sessions.

Referring now to FIG. 6, another technique for messaging bot selection in multi-bot chat sessions will be discussed. The technique can include joining (610) a user profile and a plurality of different messaging bots into a group chat session being conducted over a messaging computer system. The technique can further include receiving (620), via the messaging computer system, a first natural language requirement data set from the user profile. Additionally, the first requirement data set can be sent (630) to the plurality of messaging bots via the messaging computer system. A first solution data set can be generated (640) via a first messaging bot of the plurality of bots. The first solution data set can be responsive to the first requirement data set, with the first solution data set including a first natural language script that describes a first proposed solution that is responsive to the first requirement data set. The technique can also include generating (650) a second solution data set via a second messaging bot of the plurality of bots, with the second solution data set being responsive to the first requirement data set, with the second solution data set including a second natural language script that describes a second proposed solution that is responsive to the first requirement data set. The following acts can be performed via the messaging computer system as part of the session: sending (660) the first natural language script and the second natural language script to the user profile in response to the first requirement data set; sending (670) at least a portion of the first solution data set to the second messaging bot; and sending (680) at least a portion of the second solution data set to the first messaging bot. A stored record of the session can be maintained (682) via the messaging computer system, with the record of the session including a record of the first requirement data set, the first solution set, and a record of the second solution set. A third messaging bot can be joined (684) into the session, with the joining comprising sending the record of the first requirement data set, the record of the first solution set and the record of the second solution set from the stored record of the session to the third messaging bot. Additionally, a third solution data set can be generated (686) via the third messaging bot, with the third solution data set being response to the first requirement data set, and with the third solution data set including a third natural language script that describes a third proposed solution that is responsive to the first requirement data set. The third language script can be sent (688) to the user profile via the messaging computer system. At least a portion of the third solution data set can be sent (689) to the first messaging bot and to the second messaging bot. A selection of the first messaging bot for providing a selected solution to the first requirement data set can be received (690), and an indication of the selection can be transmitted (695) to the first messaging bot. This technique can include the features of the following paragraphs that are described with reference to this technique of FIG. 6, in any combination with each other.

The technique of FIG. 6 can include processing a request from the user profile to join the third messaging bot into the session. The joining of the third messaging bot into the session can be performed in response to the request from the user profile to join the third messaging bot into the session.

The second proposed solution of the FIG. 6 technique can be responsive to the first requirement data set and responsive to the first solution data set.

The first solution data set may further include a first set of computer-readable data that describes the first proposed solution, with the first set of computer-readable data being different from the first natural language script. The second solution data set can further include a second set of computer-readable data that describes the second proposed solution, with the second set of computer-readable data being different from the second natural language script. The sending of at least a portion of the first solution data set to the second messaging bot can include sending the first set of computer-readable data to the second messaging bot. Additionally, the sending of at least a portion of the second solution data set to the first messaging bot can include sending the second set of computer-readable data to the first messaging bot. Also, the selection can be a natural language selection.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A computer-implemented method comprising the following acts:
   joining a user profile and a plurality of different messaging bots into a group chat session being conducted over a messaging computer system;

receiving, via the messaging computer system as part of the session, a first natural language requirement data set associated with the user profile;

sending, via the messaging computer system as part of the session, the first requirement data set to the plurality of messaging bots;

providing, as part of the session via a first messaging bot of the plurality of bots, a first solution data set in response to receiving the first requirement data set, with the first solution data set including a first natural language script that describes a first proposed solution that is responsive to the first requirement data set;

providing, as part of the session via a second messaging bot of the plurality of bots, a second solution data set in response to receiving the first requirement data set and the first solution data set, with the second solution data set including a second natural language script that describes a second proposed solution that is responsive to the first requirement data set and responsive to the first solution data set;

receiving, as part of the session, a user input selection of the first messaging bot for providing a selected solution related to the first requirement data set, with the selection being associated with the user profile; and transmitting to the first messaging bot an indication of the selection as part of the session.

2. The computer-implemented method of claim 1, wherein the acts further comprise:

generating, via a third messaging bot of the plurality of bots, a third solution data set in response to receiving the first requirement data set, with the third solution data set including a third natural language script that describes a third proposed solution that is responsive to the first requirement data set, with the third proposed solution supplementing the first proposed solution, with the third proposed solution and the first proposed solution each fulfilling part of the first requirement data set;

presenting the third natural language script in response to the first requirement data set;

sending at least a portion of the third solution data set to the first messaging bot and the second messaging bot;

sending at least a portion of each of the first solution data set and the second solution data set to the third messaging bot; and transmitting to the third messaging bot an indication of the selection as part of the session, wherein the selection is a selection of the first messaging bot and the third messaging bot to provide a combined solution related to the first requirement data set.

3. The computer-implemented method of claim 1, wherein the acts further comprise generating, via the second messaging bot, an initial solution data set in response to receiving the first requirement data set, with the initial solution data set including an initial natural language script that describes an initial proposed solution that is responsive to the first requirement data set and is not responsive to the first solution data set, with the generating of the initial solution data set being prior to the generating of the first solution data set.

4. The computer-implemented method of claim 1, wherein the acts further comprise:

receiving, via the messaging computer system, a second natural language requirement data set associated with the user profile at a computing device;

sending, via the messaging computer system, the second requirement data set to the plurality of messaging bots; and generating, via the first messaging bot, a third solution data set in response to receiving the second requirement data set, with the third solution data set including a third natural language script that describes a third proposed solution that is responsive to the second requirement data set, wherein the selection of the first messaging bot for providing a selected solution related to the first requirement data set comprises selecting the first messaging bot for providing a solution to the second requirement data set.

5. The computer-implemented method of claim 1, wherein the acts comprise the messaging computer system tracking the session using one or more computer-readable session identifiers.

6. The computer-implemented method of claim 1, wherein:

the first solution data set further includes a first set of computer-readable data that describes the first proposed solution, and with the first set of computer-readable data being different from the first natural language script;

the second solution data set further includes a second set of computer-readable data that describes the second proposed solution, with the second set of computer-readable data being different from the second natural language script;

the sending of at least a portion of the first solution data set to the second messaging bot comprises sending the first set of computer-readable data to the second messaging bot; and the sending of at least a portion of the second solution data set to the first messaging bot comprises sending the second set of computer-readable data to the first messaging bot.

7. The computer-implemented method of claim 1, wherein the selection is a natural language selection, and wherein the acts further comprise arranging for providing the selected solution via the first messaging bot using natural language scripts as part of the session after the receiving of the selection of the first messaging bot.

8. The computer-implemented method of claim 7, wherein acts comprise removing the second messaging bot from the session in response to the receiving of the selection, and before at least a portion of the arranging for providing the selected solution.

9. The computer-implemented method of claim 1, wherein the acts further comprise:

generating, via the first messaging bot, a natural language statement regarding the second proposed solution; and providing the natural language statement as part of the session.

10. A computer system, comprising:

at least one processor; and memory comprising instructions stored thereon that when executed by at least one processor cause at least one processor to perform acts comprising:

joining a user profile and a plurality of different messaging bots into a group chat session being conducted over a messaging computer system;

receiving, via the messaging computer system as part of the session, a first natural language requirement data set associated with the user profile;

sending, via the messaging computer system as part of the session, the first requirement data set to the plurality of messaging bots;

processing a first solution data set received from a first messaging bot of the plurality of bots as part of the session, with the first solution data set being responsive to the first requirement data set, with the first solution data set including a first natural language script that describes a first proposed solution that is responsive to the first requirement data set, with the first solution data set further including a first set of computer-readable data that describes the first proposed solution, and with the first set of computer-readable data being different from the first natural language script;

processing a second solution data set received from a second messaging bot of the plurality of bots as part of the session, with the second solution data set being responsive to the first requirement data set, with the second solution data set including a second natural language script that describes a second proposed solution that is responsive to the first requirement data set, with the second solution data set further including a second set of computer-readable data that describes the second proposed solution, and with the second set of computer-readable data being different from the second natural language script;

receiving a user input selection of the first messaging bot for providing a selected solution to the first requirement data set as part of the session, with the selection being associated with the user profile; and transmitting to the first messaging bot an indication of the selection as part of the session.

11. The computer system of claim 10, further comprising, verifying via the messaging computer system that the first natural language script matches the first set of computer-readable data.

12. The computer system of claim 10, wherein the second solution data set is an initial second solution data set, and wherein the acts further comprise:

the second messaging bot modifying the initial second solution data set to produce a modified second solution data set in response to processing the first set of computer-readable data from the first messaging bot; and processing the modified second solution data set received from the second messaging bot of the plurality of bots as part of the session.

13. The computer system of claim 10, wherein the acts further comprise:

receiving, via the messaging computer system, a second natural language requirement data set associated with the user profile at a computing device, with the second requirement data set being a modification of the first requirement data set;

sending, via the messaging computer system, the second requirement data set to the plurality of messaging bots; and processing a third solution data set received from the first messaging bot as part of the session, with the third solution data set being responsive to the second requirement data set, with the third solution data set including a third natural language script that describes a third proposed solution that is responsive to the second requirement data set, wherein the selection of the first messaging bot for providing a selected solution related to the first requirement data set comprises selecting the first messaging bot for providing a solution to the second requirement data set.

14. The computer system of claim 10, wherein the acts further comprise arranging for providing the selected solution via the first messaging bot using natural language scripts as part of the session after the receiving of the selection of the first messaging bot.

15. The computer system of claim 14, wherein the acts comprise removing the second messaging bot from the session in response to the receiving of the selection, and before at least a portion of the arranging for providing the selected solution.

16. One or more computer-readable memory having computer-executable instructions embodied thereon that, when executed by at least one processor, cause at least one processor to perform acts comprising:

joining a user profile and a plurality of different messaging bots into a group chat session being conducted over a messaging computer system;

receiving, via the messaging computer system, a first natural language requirement data set associated with the user profile;

sending, via the messaging computer system, the first requirement data set to the plurality of messaging bots;

providing, as part of the session, a first solution data set via a first messaging bot of the plurality of bots, with the first solution data set being responsive to the first requirement data set, with the first solution data set including a first natural language script that describes a first proposed solution that is responsive to the first requirement data set;

providing, as part of the session, a second solution data set via a second messaging bot of the plurality of bots, with the second solution data set being responsive to the first requirement data set, with the second solution data set including a second natural language script that describes a second proposed solution that is responsive to the first requirement data set;

maintaining a stored record of the session via the messaging computer system, with the record of the session including a record of the first requirement data set, a record of the first solution set, and a record of the second solution set;

joining a third messaging bot into the session, with the joining comprising sending the record of the first requirement data set, the record of the first solution set and the record of the second solution set from the stored record of the session to the third messaging bot;

providing, as part of the session, a third solution data set via the third messaging bot, with the third solution data set being response to the first requirement data set, and with the third solution data set including a third natural language script that describes a third proposed solution that is responsive to the first requirement data set;

receiving, as part of the session, a user input selection of at least one selected messaging bot that is one or both of the first messaging bot or the third messaging bot for providing a selected solution to the first requirement data set, with the selection being associated with the user profile; and transmitting to the at least one selected messaging bot an indication of the selection.

17. The one or more computer-readable memory of claim 16, wherein the acts comprise processing a request associated with the user profile to join the third messaging bot into the session, and wherein the joining of the third messaging bot into the session is performed in response to the request associated with the user profile to join the third messaging bot into the session.

18. The one or more computer-readable memory of claim 16, wherein the third proposed solution is responsive to the first requirement data set and responsive to the first solution data set.

19. The one or more computer-readable memory of claim 16, wherein:

the first solution data set further includes a first set of computer-readable data that describes the first proposed solution, with the first set of computer-readable data being different from the first natural language script; and the second solution data set further includes a second set of computer-readable data that describes the second proposed solution, with the second set of computer-readable data being different from the second natural language script.

20. The one or more computer-readable memory of claim 16, wherein the at least one selected messaging bot is a combination of the first messaging bot and the third messaging bot.

* * * * *